United States Patent
Kojima et al.

(10) Patent No.: US 6,640,100 B1
(45) Date of Patent: *Oct. 28, 2003

(54) RADIO COMMUNICATION SYSTEM

(75) Inventors: Satoshi Kojima, Kanagawa (JP); Akira Hirao, Kanagawa (JP); Junichi Kimura, Kanagawa (JP); Katsushi Koyama, Kanagawa (JP)

(73) Assignee: Kyocera Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,902

(22) Filed: Jun. 28, 1999

(30) Foreign Application Priority Data

Jun. 30, 1998 (JP) .......................... 10-184682

(51) Int. Cl.[7] ................................ H04Q 7/20
(52) U.S. Cl. .................. 455/422; 455/465; 455/11.1; 455/554; 455/555
(58) Field of Search ................ 455/422, 465, 455/11.1, 554, 555

(56) References Cited

U.S. PATENT DOCUMENTS

| | | | | |
|---|---|---|---|---|
| 5,265,150 A | * | 11/1993 | Helmkamp et al. | 455/555 |
| 5,533,027 A | * | 7/1996 | Akerberg et al. | 370/347 |
| 5,724,665 A | * | 3/1998 | Abbasi et al. | 455/561 |
| 5,953,676 A | * | 9/1999 | Berry et al. | 455/564 |
| 6,128,512 A | * | 10/2000 | Trompower et al. | 455/561 |

FOREIGN PATENT DOCUMENTS

| | | |
|---|---|---|
| JP | Hei. 6-177832 | 6/1994 |
| JP | Hei. 8-506471 | 7/1996 |

\* cited by examiner

*Primary Examiner*—Nay Maung
*Assistant Examiner*—Alan Gantt
(74) *Attorney, Agent, or Firm*—Schulte Roth & Zabel LLP; Joel Lutzker; Anna Vishev

(57) ABSTRACT

A large-capacity WLL base station 7 as a wireless local loop base station is wirelessly linked to a PHS radio station 10 of about 10 channels which accepts the connection thereto of various PHS terminals 12 and a fixed subscriber's terminal 11 which can accommodate a plurality of fixed telephone sets 13, by use of a PHS band different from that of the PHS terminal 12. The fixed subscriber's terminal 11 and the PHS radio station 10 are located within one communication area of the large-capacity WLL base station 7. Thereby, it is provided a radio communication system which provides efficient construction of wireless communications facilities by locating subscribers of a wireless local loop and a base station for microcell-basis, portable communication terminals within a communication area.

7 Claims, 5 Drawing Sheets

RADIO COMMUNICATION SYSTEM

BACKGROUND OF THE INVENTION

The present invention relates to a wireless communication system, and more particularly to a wireless communication system by the utilization of a WLL (wireless local loop) system.

Recently, attention is paid to the WLL system in constructing communications facilities because it has the following advantages. The WLL system provides quick and economical construction of communication facilities. The WLL system is capable of flexibly complying with various demands and requirements. The WLL-based communication facility is easy in its maintenance and is hard to be damaged in a disastrous event.

The WLL system replaces a conventional wire access equipment, which uses metallic wire cables, with a wireless access equipment. The access equipment connects end users as subscribers to a node point owned and managed by an enterpriser concerned. When the radio access equipment is employed, an access network capable of providing a subscriber telephone service can be constructed economically and for short time. Further, maintenance of the resultant access network is easy, and is capable of flexibly complying with various demands and requirements by the subscribers.

Technique on the WLL is disclosed in JP-A1-8-506471 and JP-A-6-177832. A system diagram showing a conventional WLL is shown in FIG. 5. In the figure, a public switched telephone network (PSTN) 105 is connected to a wireless access network 111 111a and 111b) through subscriber's lines. Those wireless access networks 111 are connected to digital wireless transceivers RP101 (101a to 101c) as shown.

Each digital wireless transceiver RP101 is a transceiver which covers a relatively narrow range of communication. The transceiver is wirelessly linked to wireless fixed access units 107 (107a, 107b) or portable, wireless telephone sets 110 (110a, 110b). The wireless fixed access units 107 are connected to home telephones, as shown. Thus, the conventional technique realizes the wireless connection of home telephones to the public switched telephone network by use of the wireless fixed access unit 107.

The WLL by the conventional technique is able to connect the mobile subscribers as well as the fixed subscribers to the public switched telephone network (PSTN). In this case, the mobile subscribers are placed in various limits on their moving area. This is not essential to the present invention, however, and hence no further description will be given here.

The conventional technique will be described on the WLL system applied to a microcell basis wireless communication system, such as a PHS system (this WLL system=PHS-WLL). The PHS (personal handyphone system) is a simplified mobile phone system standard (RCR-STD 28) which is realized in Japan, and employs a TDMA (time division multiple access) system. The PHS-WLL is an example of WLL of the TDMA system using air interface of the PHS.

In general PHS-WLL systems, a communicable distance (distance between a base station and a subscriber) is 3 to 5 km for the fixed subscriber, and approximately 100 m to 500 m for the mobile subscriber. These figures show that a communicable area of the mobile subscriber is only in the vicinity of the base station. In other words, to enlarge the communicable area of the mobile subscriber, the necessity is to install the base stations at intervals of 200 m to 1000 m (two times as long as the communicable distance or range). In this case, the fixed subscriber accommodates cells each of 200 m to 1000 m.

The following problems arise in a telephone network where the mobile subscribers and the fixed subscribers are accommodated in one base station.

(1) A number of connections existing in the range from a telephone exchange to a base station is increased since the number of base stations installed is increased. Use of the wires for those connections will deny the basic concept of the WLL system, which is directed to reduction of the number of wires used.

(2) An attempt, generally employed, to increase the speech quality of the fixed subscriber is to increase the quality in the wireless path by use of a directional antenna of the radio set of the fixed subscriber. However, radio interference between and among adjacent cells rejects the attempt, and even if so done, the speech quality guaranteeing is impossible.

(3) When a number of calls are directed to a cell, a call originated by the fixed subscriber fails to seize the radio channel, resulting in failure of speech communication.

SUMMARY OF THE INVENTION

An object of the present invention is to provide a radio communication system which provides efficient construction of wireless communications facilities by locating subscribers of a wireless local loop and a base station for microcell-basis, portable communication terminals within a communication area.

The present invention provides the following solutions to the problems mentioned above:

(1) A base station accommodating fixed subscribers has a communication area of 3 km to 5 km in radius, and is arranged as in the ordinary PHS-WLL. The speech quality of the fixed subscribers is improved by use of a directional antenna for the fixed subscriber's radio sets, as a matter of course.

(2) A base station for mobile subscribers has a communication area of 100 m to 500 m in radius, and is arranged as in the ordinary PHS system.

(3) The base station for mobile subscribers is wirelessly linked to the base station for fixed subscribers, and the former serves as a repeater and has a major function of frequency conversion.

(4) The radio frequencies allocated to the fixed subscribers are different from those allocated to the mobile subscribers, eliminating radio interference therebetween.

(5) The traffic intensity of the base station for fixed subscribers is large, and then the maximum simultaneous communication capability (number of speech channels) is increased.

(6) In the base station for fixed subscribers, all the channels are fixedly assigned to the fixed subscribers and the mobile subscribers, to thereby give rise to no deterioration of the switching performance of the fixed subscribers even if a number of calls are directed to a cell.

It should expressly be understood that the numerals indicative of the radium of the communication area are those of an ordinary PHS system, and is presented to by way of example, and those limits the concept of the present invention in any way.

DETAILED DESCRIPTION OF THE PREFERRED EMBODIMENTS

A preferred form of a radio communication system constructed according to the present invention will be described in detail with reference to the accompanying drawings.

Figure 1:
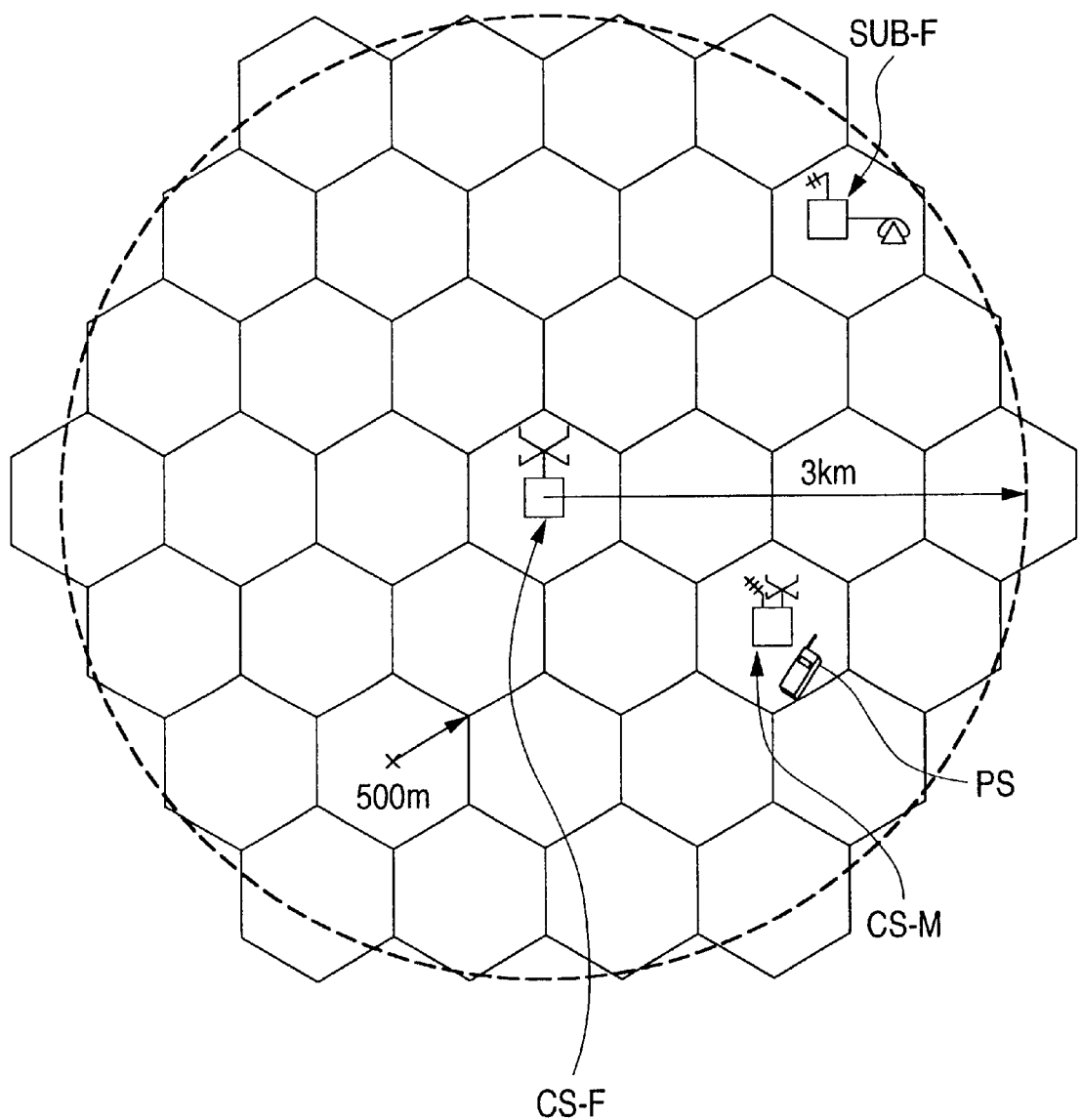
FIG. 1 is a diagram showing a radio zone constructed according to the present invention.

Before proceeding with the embodiment description, a radio zone constructed according to the present invention will first be described with reference to FIG. 1.

A base station CS-F for fixed subscribers embedded in the telephone network has a communication area whose radius is 3 km. In this case, 37 number of base stations CS-M for mobile subscribers, each having a communication range of 500 m in radius, are arranged within the communication area of 500 m in radius in a honeycomb fashion (each cell is hexagonal in shape).

A plurality of radio sets SUB-F for fixed subscribers are also arranged within this communication area. Each radio set SUB-F includes a telephone set. The radio set SUB-F wirelessly connects to the base station CS-F and performs voice and data communication at a frequency of the fixed subscriber in a radio frequency band exclusively allocated. The base station CS-F wirelessly connects to each base station CS-M at a radio frequency for the fixed subscribers in the same frequency band as above.

A mobile subscriber terminal PS which is allowed to communicate at any place wirelessly connects to a base stations CS-M at the communication area in which the mobile subscriber terminal PS is located at present at a frequency in another radio frequency band exclusively allocated thereto. In this case, the base stations CS-M serves as a repeater and wirelessly connects to the base station CS-F to perform voice and data communication.

Calculation on a traffic intensity in the radio zone under discussion will be described. The erlang-B formula, typically used in the traffic theory, will be used for the calculation.

A maximum communication capability (number of speech channels) of the base station CS-F is assumed to be 3. A traffic intensity that can be used by the mobile subscriber is: 0.46 erlang/CS×37=17 erlang. The speech-channel resource of the base station CS-F necessary for accepting this traffic intensity is about 27 channels. If the traffic intensity of each mobile subscriber is 0.05 erlang/subscriber and the loss probability is 1%, it can contain about 330 number of subscribers.

If a maximum simultaneous communication capability (number of speech channels) of the base station CS-F is 100, 73 channels may be used for the fixed subscribers (73=100−27 (=channels for the mobile subscribers)). If the traffic intensity of each mobile subscriber is 0.1 erlang/subscriber and the loss probability is 1%, it of 73 channels can accommodate about 590 number of subscribers.

An example of frequency allocation required in the above examples will be described.

In the base station CS-F, 27 channels as the maximum communication capability suffice for a simultaneous communication of the mobile subscribers. In case where the carrier frequency interval of the PHS system is 600 kHz where no adjacent channels are not used, the TDMA system can use 4 channels for each carrier. The base station CS-F of 27 channels requires 7 carriers and the frequency band of 4.2 MHz.

A maximum of 73 channels are used for the simultaneous communication by the fixed subscribers, calculation similar to that for the mobile subscribers shows that the base station CS-F requires 19 carriers and the frequency band of 11.4 MHz.

The base station CS-F contains the channels for the mobile subscribers. Therefore, it requires a total of 15.6 MHz for its frequency band allocated thereto.

Where the spatial multiple communication system is employed for the network including the base station CS-F and the radio sets SUB-F, the necessary frequency band, 11.4 MHz, may be further narrowed. The band-reduction technique is not essential to the invention, and hence no description about it will be given here.

Directional antennae are available for the radio wave reception and transmission of the radio sets SUB-F and the base station CS-F for fixed subscribers of the base station CS-M for mobile subscribers. In this case, the speech quality improvement may be excepted.

The operation of the base stations CS-M for mobile subscribers will be described.

A mobile subscriber terminal PS originates a call request to a base station CS-M, and the CS-M transfers it to a base station CS-F. When the base station CS-F judges that a speech channel allocation is possible, it sends a message of the speech channel allocation to the base station CS-M. As a result, a speech link is established between the base station CS-F and the base station CS-M. Thereafter, a speech link is set up also between the base station CS-M and the mobile subscriber terminal PS. Subsequent message exchange voice information transmission are basically performed such that the base station CS-M sends messages and voice information received from the mobile subscriber terminal PS and the base station CS-F in the reverse directions. When a situation requires the releasing of the channels, the base station CS-M releases the channels to both the stations.

When receiving an incoming call, the base station CS-M sends an incoming-call call to the mobile subscriber terminal PS. If receiving a response from the mobile subscriber terminal PS, the base station CS-M transfers it to the mobile subscriber terminal PS. As in the case of an outgoing call, the base station CS-M controls the establishment and release of the radio link during the transfer of a message.

Judgement as to whether a call is generated by a fixed subscriber or a mobile subscriber can easily be made referring to subscriber information prestored every time a call is made; the subscriber information is subscriber identifying numbers different from the telephone numbers for the originating and terminating of calls and the telephone numbers. The judgement is performed by the base station CS-F or a base-station controller 5 which supervises the base station. This reduces the traffic intensity by the mobile subscribers.

Figure 2:
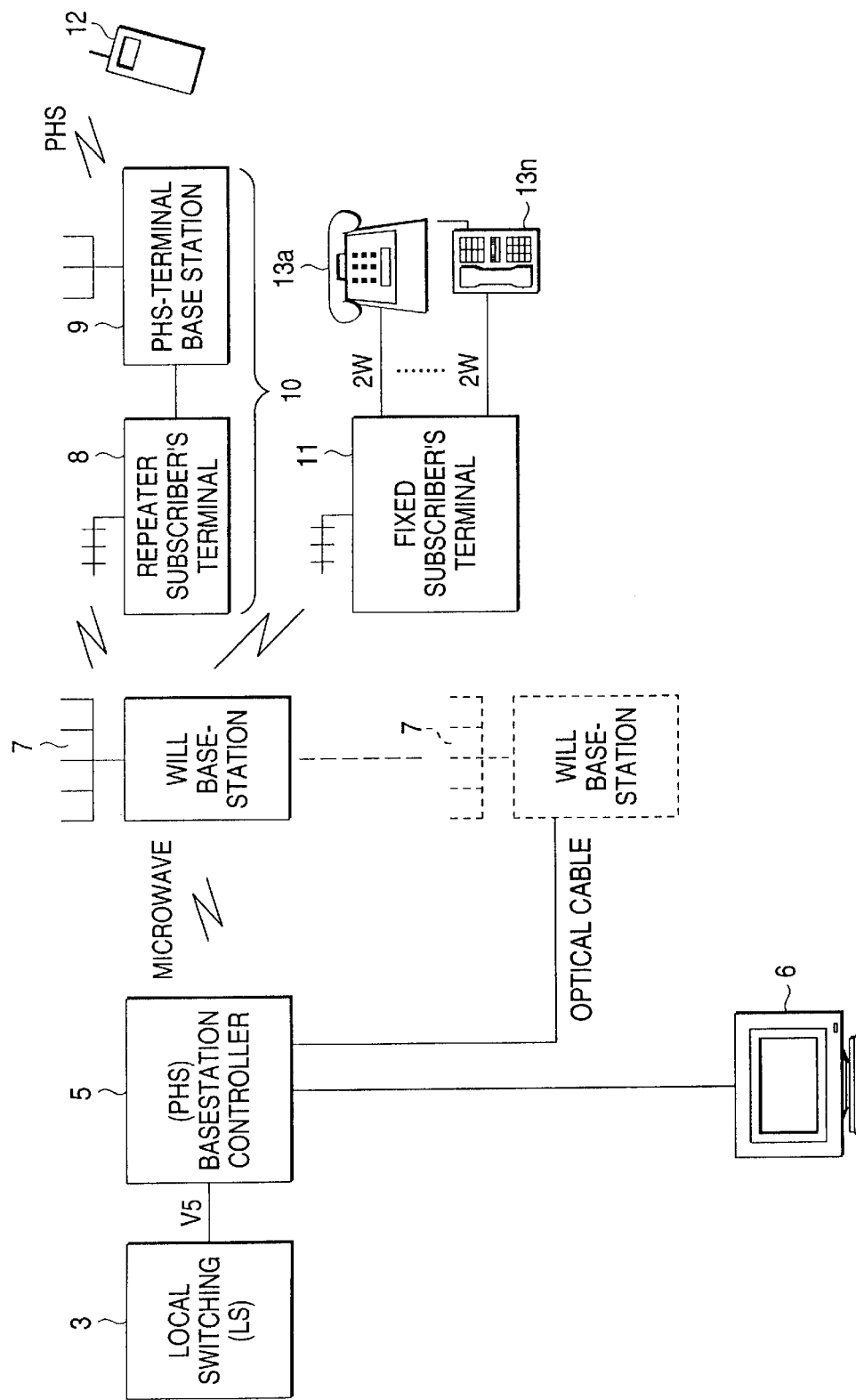
FIG. 2 is a block diagram showing a system configured when the radio communication system of the invention is applied to a PHS wireless local loop.

Referring FIG. 2, there is shown a system configured when the radio communication system of the invention is applied to a PHS wireless local loop. A local switching office 3 accommodates, for example, telephone terminals directly through subscriber's lines or after digital switching, and corresponds to terminal offices or subscriber switching offices in the general public communication network. The local switching office 3 is connected to a base-station controller 5 by use of the V5 line, recommended by ITU.

The base-station controller 5 performs an interface conversion between the interface of the local switching office 3 and the interface of a WLL base station 7 to be described later. The base-station controller 5 is connected to the WLL base station 7 by a microwave link, and corresponds to the base station CS-F in FIG. 1. The base-station controller 5 is connected to an integrated management system 6. For the connection of the base-station controller 5 with the WLL base station 7, a metallic cable or an optical cable may be used in place of the microwave link.

The integrated management system 6 manages all the communication equipment relating to the base-station controller 5 in a centralizing manner. Specific management items by the integrated management system 6 are operating status of the equipment, trouble analysis, test, registration of subscriber information and software.

The WLL base station 7 is: its communication area ranges from 3 to 5 km and the number of channels accommodated is several hundreds channels to several thousands channels. The WLL base station 7 is wirelessly linked to a PHS radio station 10 of a PHS terminal 12 (corresponds to the base station CS-M in FIG. 1) and a fixed subscriber's terminal 11 (corresponds to the radio set SUB-F in FIG. 1). In this case, the frequency band used for communication is different from that of the PHS terminal 12.

The PHS radio station 10 wirelessly linked to the WLL base station 7 as a base station of the wireless local loop. It includes a repeater subscriber's terminal 8 and a PHS-terminal base station 9. The repeater subscriber's terminal 8 is wirelessly linked to the PHS-terminal base station 9 by use of a PHS band different from that of the WLL base station 7, and provides a digital interface adaptable for the PHS-terminal base station 9. The PHS-terminal base station 9 covers a communication area of 100 m to 500 m in radius, and accommodates 3 to 15 channels. It is wirelessly linked to the PHS terminal 12 by use of the public PHS band.

Figure 3:
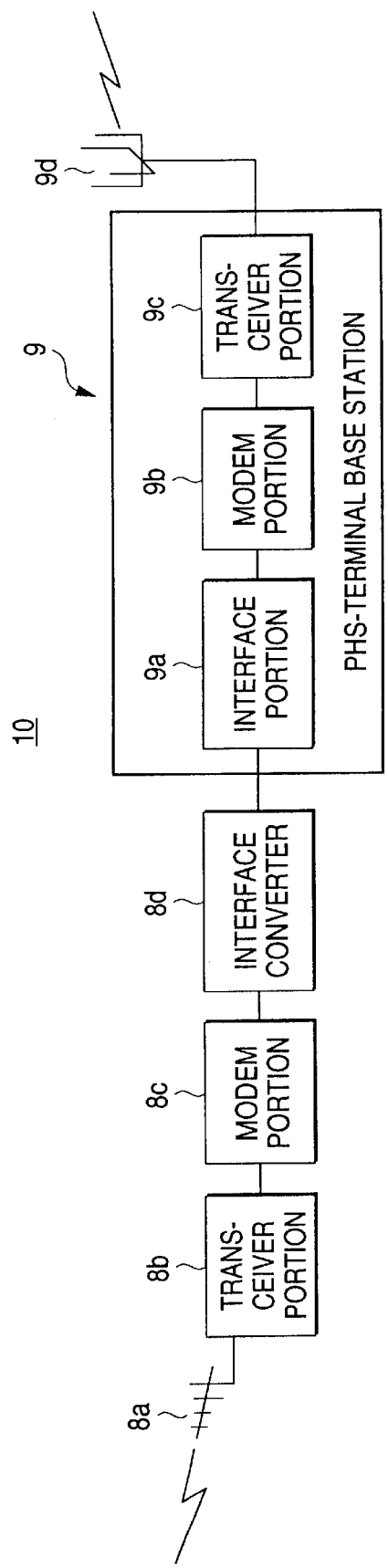
FIG. 3 is a functional block diagram showing the details of a PHS radio station.

FIG. 3 is a functional block diagram showing the details of the PHS radio station 10. As shown, the repeater subscriber's terminal 8 includes an antenna 8a for wireless communication with the WLL base station 7, a transceiver portion 8b of the wireless local loop system, a modem portion 8c and an interface convertor 8d. The transceiver portion 8b transfers voice and data to and from the WLL base station 7, and cooperates with the WLL base station 7 to form a wireless link. The modem portion 8c modulates a signal coming through the interface convertor 8d in preparation for wireless transmission, and demodulates a signal received from the transceiver portion 8b, and outputs it to the interface convertor 8d. The interface convertor 8d converts a signal, which is received from the WLL base station 7 by way of the modem portion 8c and the transceiver portion 8b, into such a signal as to be compatible with the interface of the PHS-terminal base station 9.

The PHS-terminal base station 9 is made up of an interface 9a of the wireless local loop interface system, a demodulator portion 9b, a transceiver portion 9c and an antenna 9d. The interface 9a interfaces with the repeater subscriber's terminal 8. The modem portion 9b modulates a signal coming through the interface convertor 9a in preparation for wireless transmission, and demodulates a signal received from the transceiver portion 9c and outputs it to the interface 9a. The transceiver portion 9c transmits a signal to and from the PHS terminal 12 by use of the antenna 9d.

Returning to FIG. 2, the fixed subscriber's terminal 11 is wirelessly linked to the WLL base station 7 by use of a PHS band different from that of the WLL base station 7. The fixed subscriber's terminal 11 provides subscriber interface to fixed telephone sets 13a to 13n connected to wire subscriber's lines so as to accommodate those fixed telephone sets.

Figure 4:
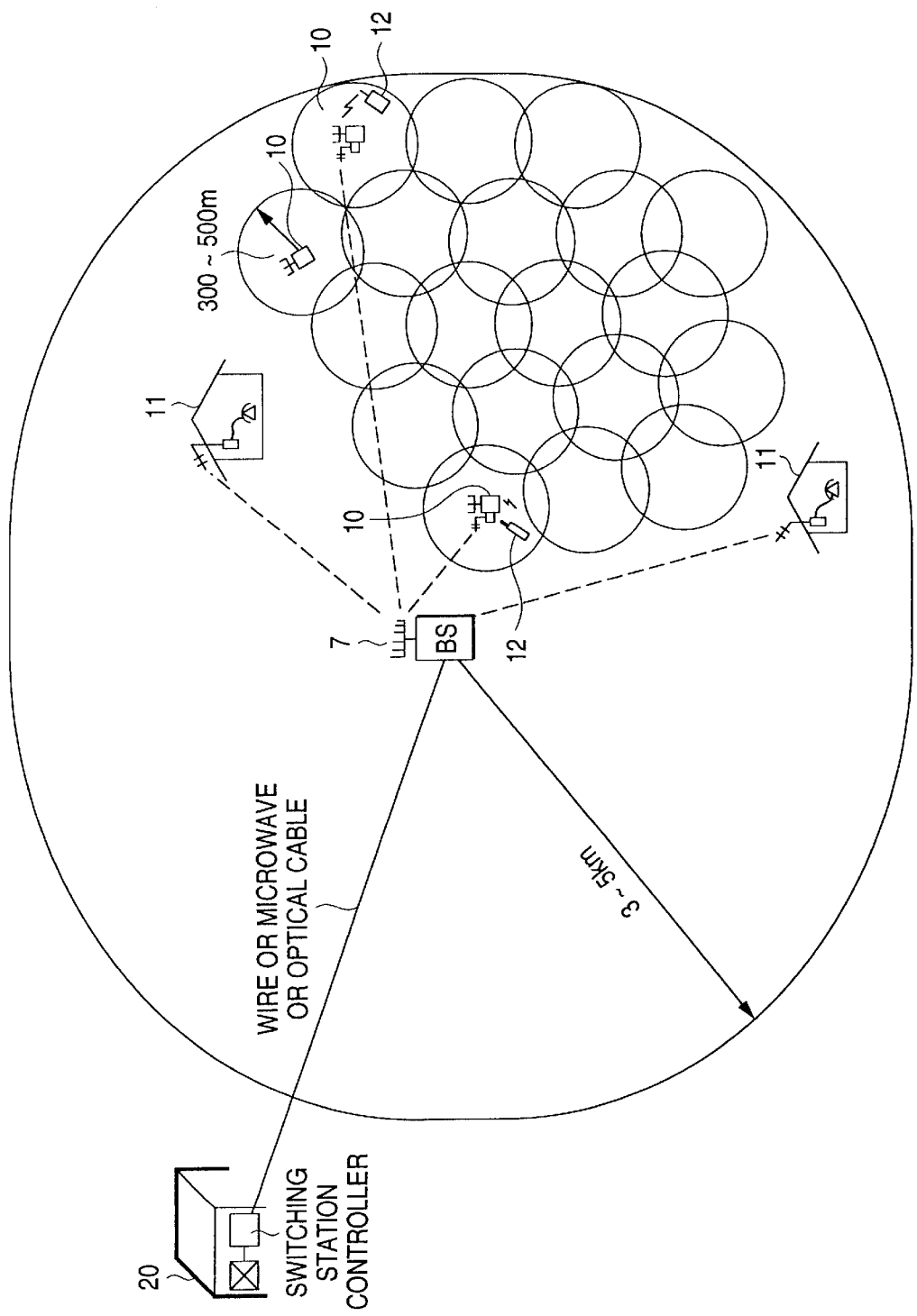
FIG. 4 is a diagram showing the wireless communication system shown in FIG. 2 in a bird's-eye fashion.
Figure 5:
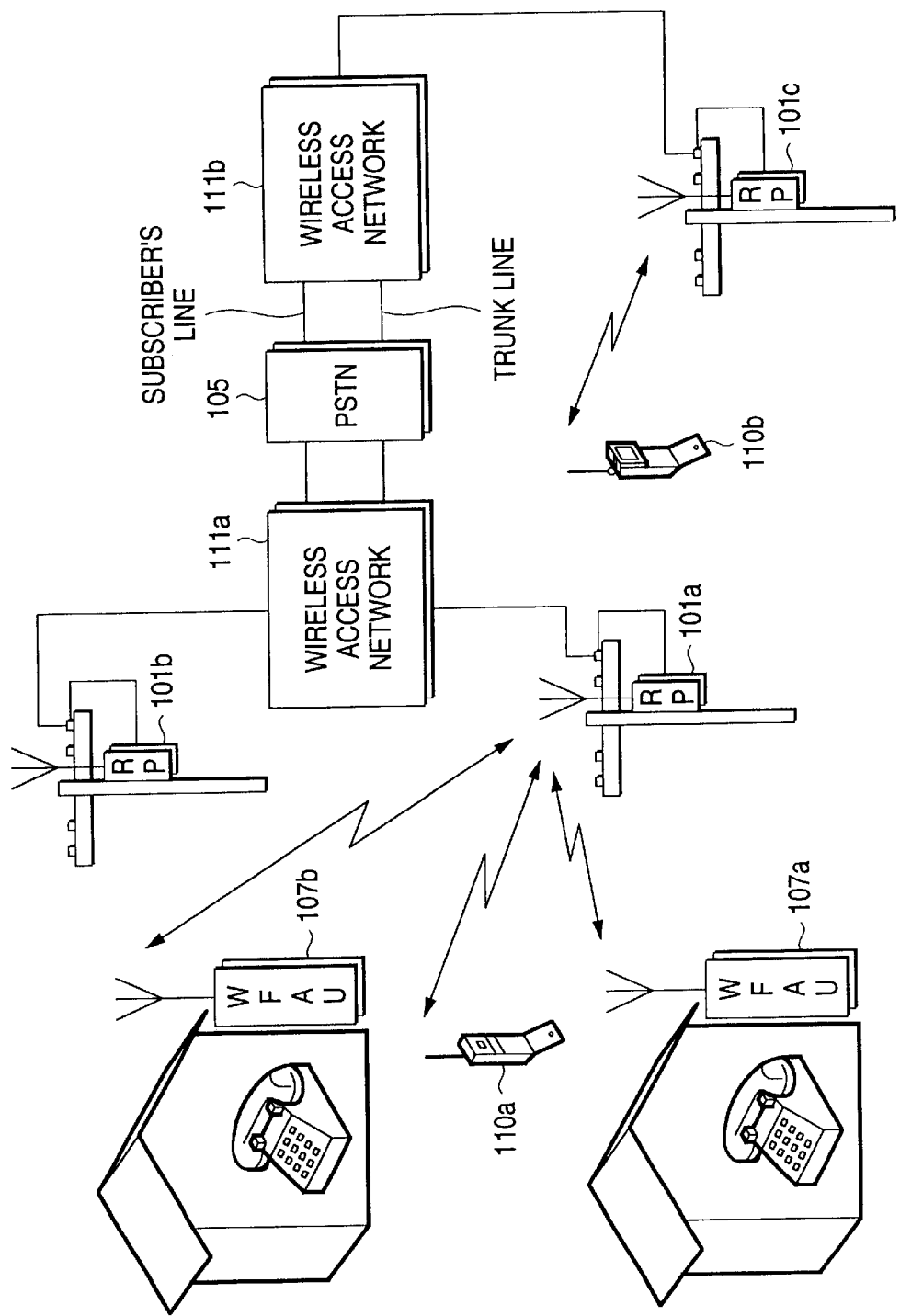
FIG. 5 is a block diagram showing a conventional wireless local loop system.

FIG. 4 is a diagram showing the wireless communication system shown in FIG. 2 in a bird's-eye fashion. In the figure, like or equivalent portions are designated by like reference numerals in FIG. 2. In FIG. 4, a base station (BS) 7 corresponds to the WLL base station 7 in FIG. 1. A telephone office 20 is made up of the local switching office 3, the base-station controller 5 and the integrated management system 6 (FIG. 1).

As seen from FIG. 4, in the embodiment of the invention, the fixed subscriber's terminal 11 and the PHS radio station 10 may be located within one cell of the WLL base station 7. The PHS radio station 10 is disposed so as to cover the whole communication area of the WLL base station 7. Thus, a large-capacity base station having a large number of channels is used for the WLL base station 7, whereby a radio communication system of high traffic intensity is realized.

The WLL base station 7 allows a radio communication system to be used for the PHS radio station 10 and the fixed subscriber's terminal 11. The result is construction simplification and easy installation of the radio communication system.

In a microcell basis wireless communication system, such as a PHS system, to which the present invention is incorporated, a radio communication system for fixed subscribers and a radio communication system for mobile subscribers can be handled in similar ways. Further, the radio communication system accommodates the mobile subscribers as well as the fixed subscribers without damaging the speech quality and the switching performance for the fixed subscribers.

In the above description, embodiments of PHS-WLL are described. However, the present invention is not limited thereto. It should be noted that the present invention is applicable to various WLL systems other than the PHS-WLL system.

What is claimed is:

1. A radio communication system comprising:
   a radio base station linked to a switching office and a base-station controller wirelessly or by wire, said radio base station defining a first communication area using a first wireless link;
   a plurality of mobile base stations, each linked to said radio base station by said first wireless link, while linked to mobile terminals by a second wireless link using a frequency band, which is different from that of said first wireless link, each of said mobile base stations defining a second communication area by use of said second wireless link based on a microcell technology; and
   a radio terminal accommodating fixed telephone sets, said radio terminal being linked to said radio base station by said first wireless link,
   at least one of said second communication areas being located entirely within said first communication area,
   said plurality of mobile base stations being located in said first communication area covered by said radio base station using said first wireless link, and
   said each mobile base station being connected for communicating with said mobile terminals by said second wireless link within said second communication area while said mobile terminals are located within said first communication area.

2. A radio communication system according to claim 1, wherein said mobile base station includes:
- a wireless local loop system transceiver portion;
- an interface converting portion; and
- a mobile terminal interface.

3. A radio communication system according to claim 1, wherein said radio terminal is a fixed subscriber's terminal accommodating a plurality of telephone sets.

4. A radio communication system comprising:
- a radio base station linked to a switching office and a base-station controller wirelessly or by wire, said radio base station defining a first communication area;
- a plurality of mobile base stations, based on the microcell technology, located within said first communication area of said radio base station, each of said mobile base stations defining a second communication area;
- a fixed subscriber's station accommodating a plurality of telephone sets, said fixed subscriber's station being located within said first communication area of said radio base station; and
- a plurality of mobile terminals being linked to said mobile base stations by a wireless link and connected to said radio base station by way of said mobile base stations;
- at least one of said second communication areas being located entirely within said first communication area,
- said telephone sets fixed to said fixed subscriber's station being directly linked to said radio base station by wireless links, and
- each of said mobile base stations being connected for communicating with said mobile terminals by said second wireless link within said second communication area while said mobile terminals are located within said first communication area.

5. A radio communication system comprising:
- a first radio base station linked to a switching office and a base-station controller wirelessly or by wire, said first radio base station defining a first communication area;
- a second radio base station linked exclusively to said first radio base station and a plurality of mobile terminals, said, second radio base station being a mobile radio base station based on the microcell technology, said second radio base station being linked to said first radio base station by a first wireless link, while being linked to mobile terminals by a second wireless link, said second radio base station defining a second communication area; and
- a third radio terminal accommodating fixed telephone sets, said third radio terminal being linked to said first radio base station by said first wireless link,
- said second communication area being located entirely within said first communication area,
- said second radio base station being connected for communicating with said mobile terminals by said second wireless link within said second communication area while said mobile terminals are located within said first communication area.

6. A radio communication system according to claim 5, wherein said second radio base station includes:
- a wireless local loop system transceiver portion;
- an interface converting portion; and
- a mobile terminal interface.

7. A radio communication system according to claim 5, wherein said third radio terminal is a fixed subscriber's terminal accommodating a plurality of telephone sets.

* * * * *